(12) United States Patent
Mao (10) Patent No.: US 6,443,316 B1
(45) Date of Patent: Sep. 3, 2002

(54) DRIPPING RACK STRUCTURE

(76) Inventor: Yue-Ling Mao, No. 8, Lane 114, Gin Ding Rd., San Min District, Kaohsiung (TW)

( * ) Notice: Subject to any disclaimer, the term of this patent is extended or adjusted under 35 U.S.C. 154(b) by 0 days.

(21) Appl. No.: 09/832,097

(22) Filed: Apr. 11, 2001

(51) Int. Cl.$^7$ .................................................. A47F 5/00
(52) U.S. Cl. ..................... 211/74; 211/75; 211/59.1; 211/41.3; 248/220.31
(58) Field of Search .................... 211/41.3, 41.4, 211/41.5, 59.1, 74, 75; 312/229; 248/220.31, 222.12, 224.7

(56) References Cited

U.S. PATENT DOCUMENTS

| | | | |
|---|---|---|---|
| 507,233 A | * 10/1893 | Marshall | |
| 776,332 A | * 11/1904 | Kloeppinger | |
| 3,433,365 A | * 3/1969 | Hodson | |
| 3,779,392 A | * 12/1973 | Betts | 211/75 |
| 3,912,212 A | * 10/1975 | Betts | 248/220.31 |
| 4,485,929 A | * 12/1984 | Betts | 211/59.1 X |
| 4,756,582 A | * 7/1988 | Heien | 211/41.3 X |
| 5,163,567 A | * 11/1992 | Betts | 211/75 |
| 5,312,178 A | * 5/1994 | King | 312/229 X |
| 5,593,045 A | * 1/1997 | Eldon et al. | 248/222.12 X |
| 5,884,784 A | * 3/1999 | Betts | 211/87.01 X |
| 6,021,906 A | * 2/2000 | Heien | 211/41.3 |

* cited by examiner

Primary Examiner—Robert W. Gibson, Jr.
(74) Attorney, Agent, or Firm—Bacon & Thomas (57) ABSTRACT

A dripping rack structure includes a rack body formed with multiple fitting holes, dripping bars, sealing caps, an upper fixing seat, a lower fixing seat, a draining sink, a draining connector and fastening members. The rack body is made by integral plastic injection molding so that it has light weight and high strength. The dripping bar is engaged in the fitting hole by tenons and mortises. A water seal is disposed in the fitting hole to avoid leakage. The mounting positions of the dripping bars can be changed according to the size of the wares. The bottom of the rack body is provided with a draining sink having an internal slope face, whereby the water flowing into the sink can be quickly drained out of the rack body through the draining connector. The rack body is mainly made of PP material so that it can be safely used and will not secondarily contaminate the washed glass wares.

4 Claims, 12 Drawing Sheets

DRIPPING RACK STRUCTURE

BACKGROUND OF THE INVENTION

The present invention relates to a dripping rack structure applicable to laboratories or other places for hanging glass wares thereon to be dried. The mounting positions of the dripping bars can be changed according to the size of the wares. The bottom of the rack body is provided with a draining sink having an internal slope face, whereby the water flowing into the sink can be quickly drained out of the rack body through the draining connector. The rack body is mainly made of PP material so that it can be safely used and will not secondarily contaminate the washed glass wares. The rack body can be easily changed between a single-face type for mounting on a wall and a double-face type for placing on a tabletop.

Figure 1:
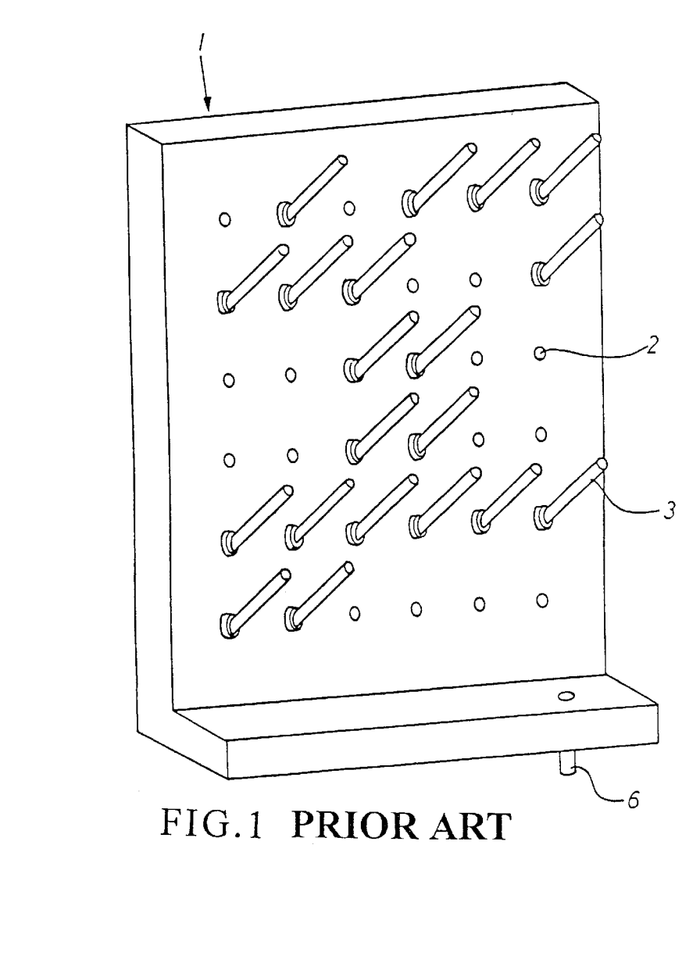
FIG. 1 is a perspective assembled view of a conventional dripping rack.
Figure 2:
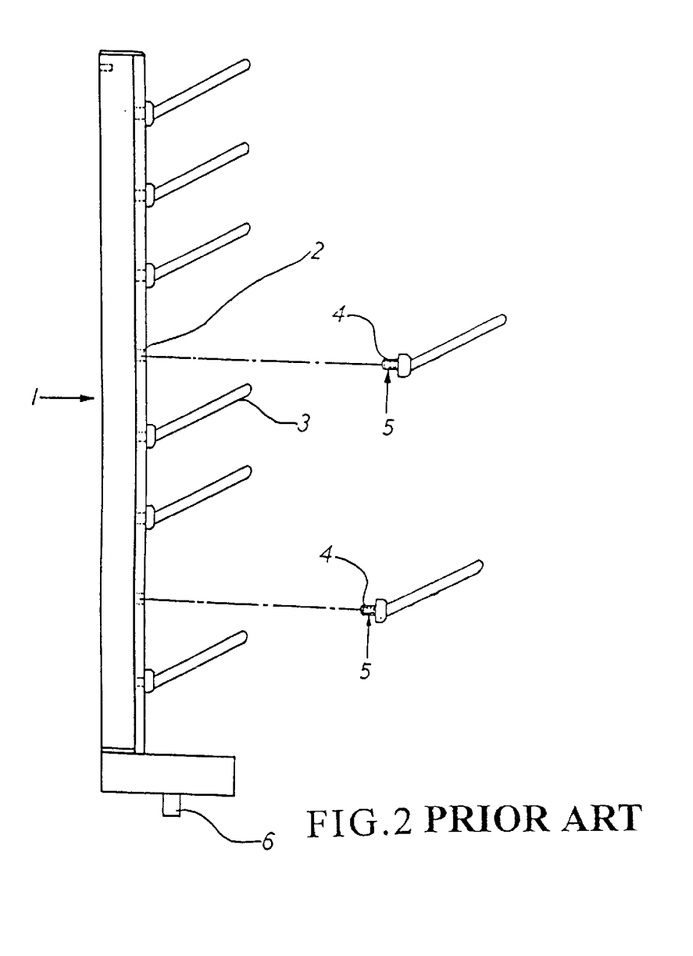
FIG. 2 is a side view of the conventional dripping rack.

FIGS. 1 and 2 show a conventional dripping rack having an upright panel 1 made of fiberglass, plastic or resin material. The panel 1 is perforated with mounting holes 2 at equal intervals. A short implant rod 4 at a rear section of each dripping bar 3 is tightly fitted into the mounting hole 2. Alternatively, the implant rod 4 is painted with a layer of glue 5 and then fitted into the mounting hole 2 and adhered thereto.

The above structure has some shortcomings as follows:

1. The panel 1 has considerable weight and is inconvenient to install.
2. In the case where the implant rod 4 of the dripping bar 3 is painted with a layer of glue 5 and then fitted into the mounting hole 2 and adhered thereto, the dripping bar 3 cannot be detached from the panel later. If the dripping bar 3 is forcedly detached, the mounting hole 2 and the dripping bar 3 will be damaged. Therefore, a user cannot adjust the number and position of the dripping bars 3 as desired.
3. In the case that the implant rod 4 of the dripping bar 3 is directly tightly fitted into the mounting hole 2, the dripping bar 3 can be later detached. However, the contacting face will be worm. After a period of use, the dripping bar 3 tends to loosen or drop down. As a result, glass ware hung thereon may drop down, and water and dirt will accumulate in the vacant mounting holes.
4. The draining tube 6 of the panel 1 projects downwardly from a lower side of the panel. Therefore, when placing such dripping rack on a table face, the draining tube 6 will lean against the table face to make it impossible to stably rest the dripping rack on the table face. Therefore, the dripping rack can only be hung on a wall and an additional base seat is necessary for placing the dripping rack on the table face. This leads to inconvenience in use.
5. The conventional dripping rack has a single-face so that it can be hung on a wall face. When assembling two dripping racks to achieve a double-face dripping rack, it is necessary to use screws, brackets, a wooden stand or silicone to connect the dripping racks. Such a structure is unstable and the appearance is poor.

SUMMARY OF THE INVENTION

It is therefore a primary object of the present invention to provide a dripping rack structure in which the rack body of the dripping rack is integrally made by plastic injection molding so that it has light weight and high strength. A dripping bar is engaged in a corresponding fitting hole of the rack body by means of tenons and mortises. Therefore, the dripping bar can be tightly located on the rack body. When detached, the dripping bar can be directly detached from the front face of the rack body. The number and position of the dripping bars can be changed according to the size of the wares to be hung. A water-sealing means is disposed in each fitting hole to avoid leakage.

It is a further object of the present invention to provide the above dripping rack structure in which, by assembling the upper and lower fixing seats in different ways, the rack body can be changed between a single-face type for mounting on a wall and a double-face type for resting on a tabletop.

It is still a further object of the present invention to provide the above dripping rack structure in which the bottom of the rack body is provided with a draining sink having an internal slope face, whereby the water dropping from the wares can flow into the draining sink and can be quickly drained out of the rack body through a draining hole formed in a lowest portion of the draining sink.

The present invention can be best understood through the following description and accompanying drawings wherein:

DETAILED DESCRIPTION OF THE PREFERRED EMBODIMENTS

Figure 3:
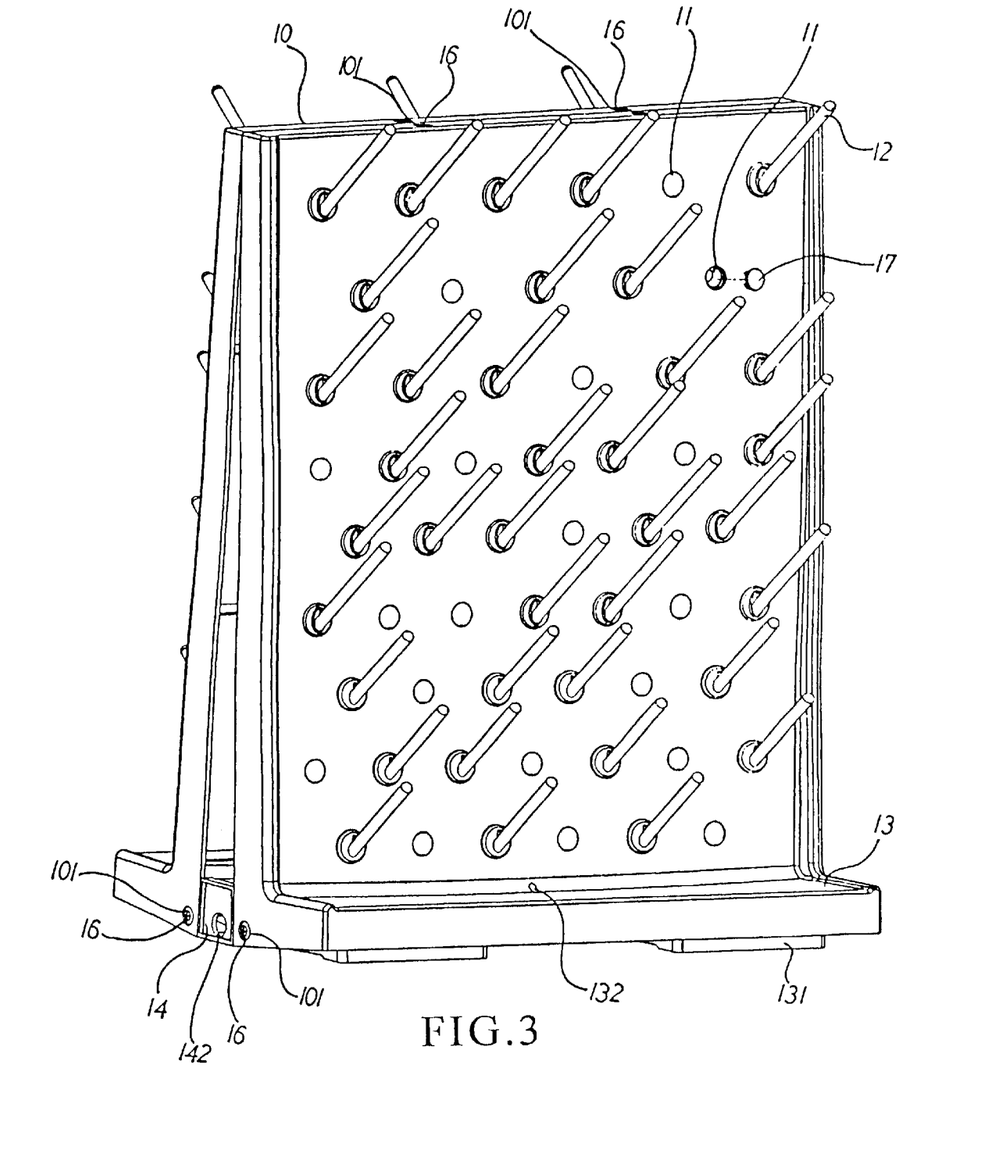
FIG. 3 is a perspective assembled view of the dripping rack of the present invention.
Figure 4A:
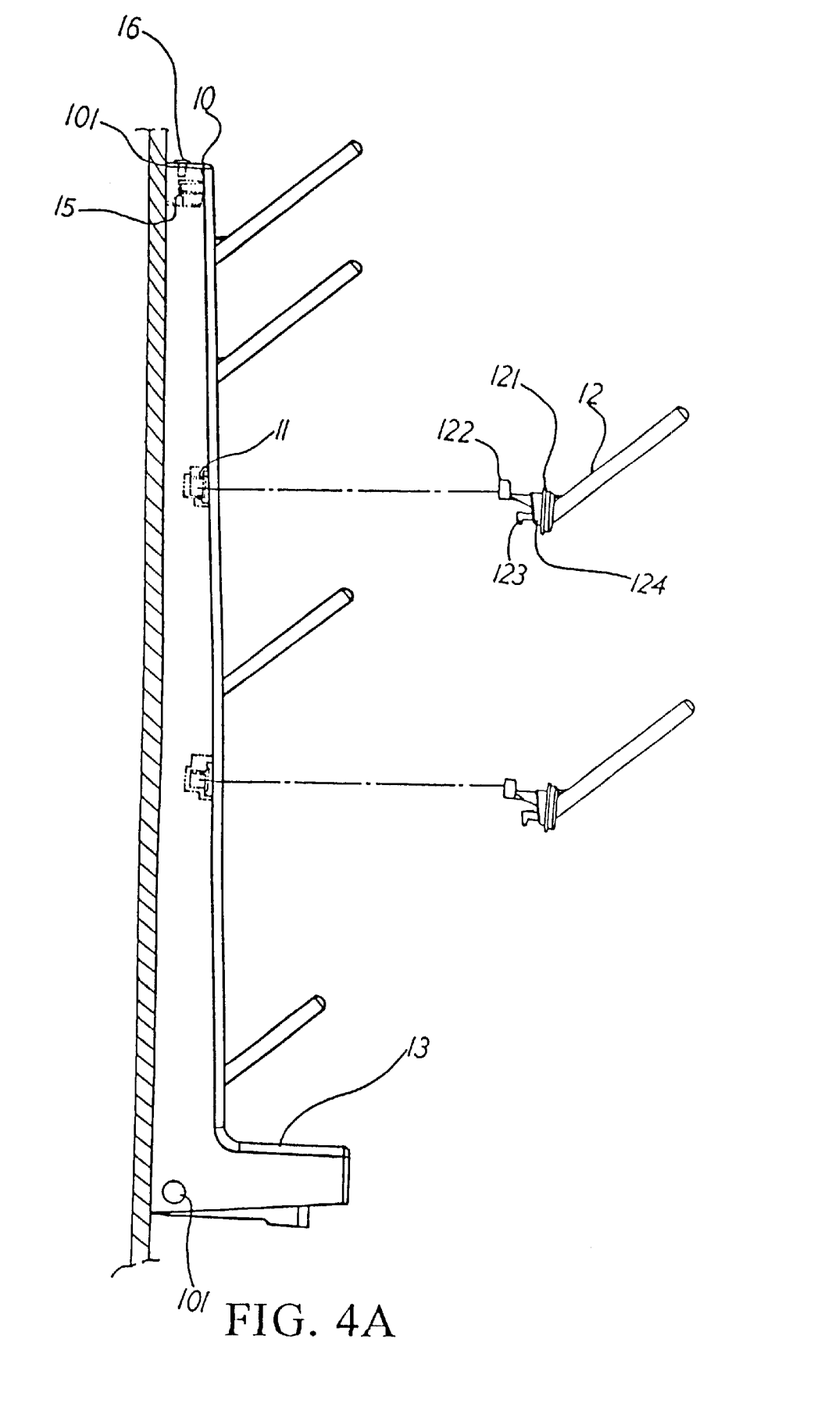
FIG. 4A is a side view of the single-face type of dripping rack of the present invention for mounting on a wall.
Figure 4B:
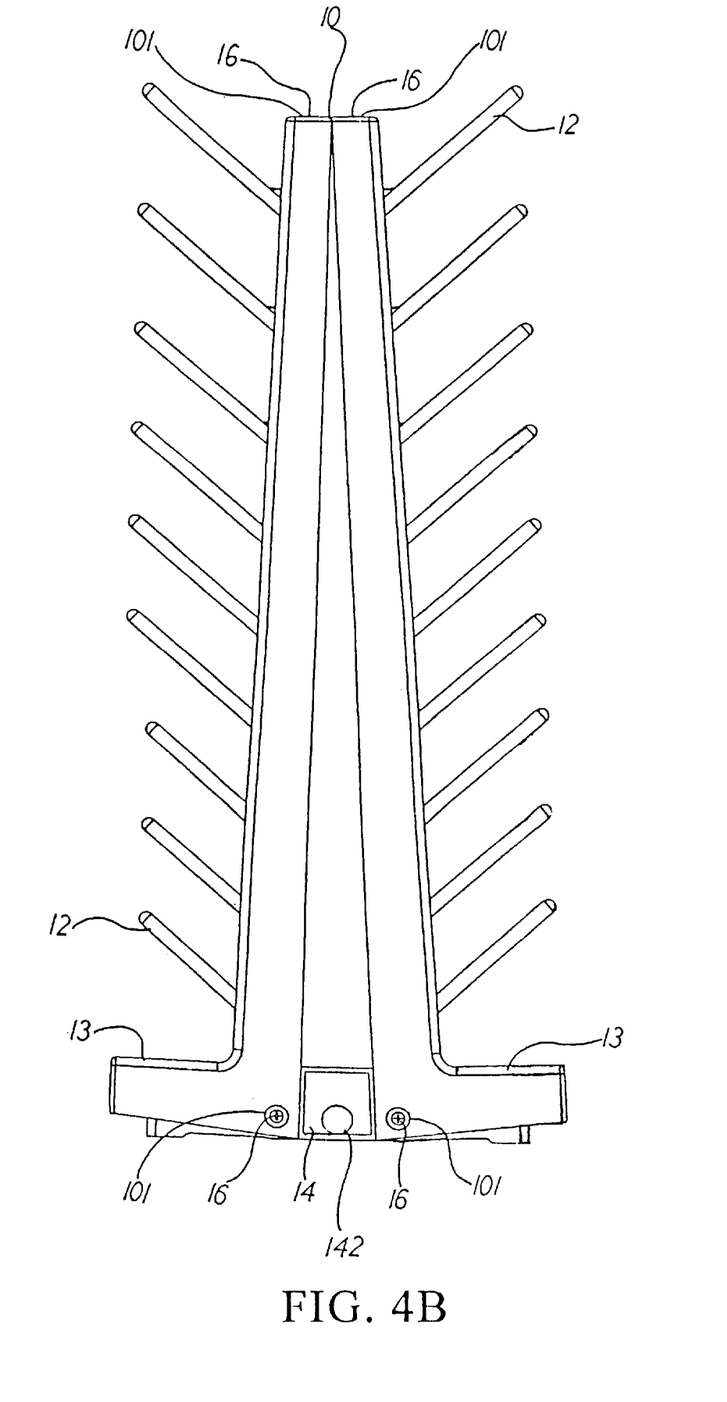
FIG. 4B is a side view of the double-face type of dripping rack of the present invention for resting on a tabletop.
Figure 9:
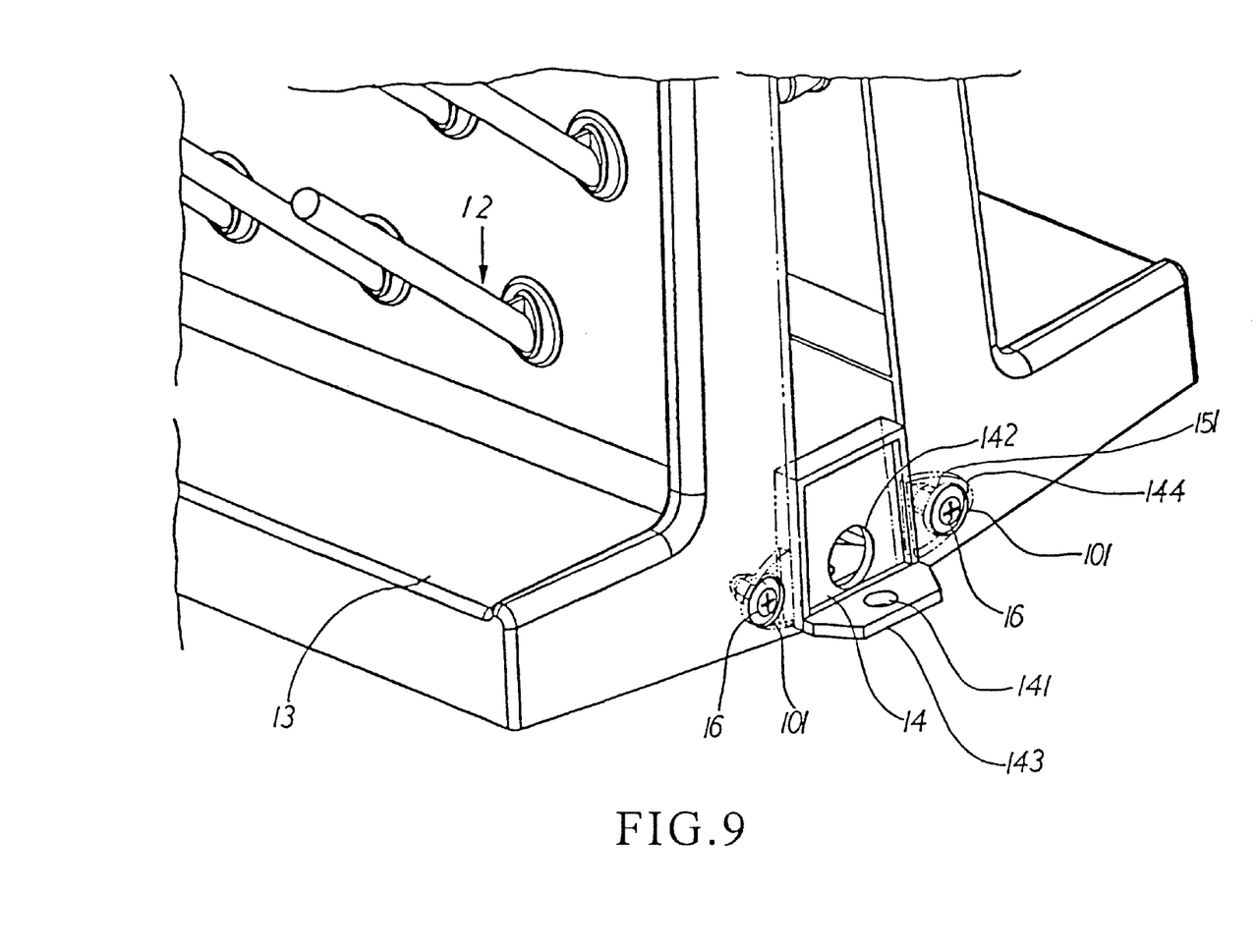
FIG. 9 is a perspective view of the lower fixing structure of a double-face type of dripping rack for resting on a tabletop.

Please refer to FIG. 3. The dripping rack structure of the present invention includes a rack body 10 formed with multiple fitting holes 11, dripping bars 12, a draining sink 13, a lower fixing seat 14, an upper fixing seat 15, fastening members 16 and sealing caps 17. The dripping bar 12 or sealing cap 17 is fitted in the fitting hole 11. The dripping bar 12 is inclined upwardly from the rack body 10. The draining sink 13 is formed on the bottom of the rack body 10. The inner side of the draining sink 13 is formed with a slope face inclined from an outer side toward a rear central portion of the draining sink. The water dripping from the dripping bars 12 can be collected in the sink and quickly drained out from the draining connector 132. The rack body 10 is formed with several fastener holes 101. By means of the upper and lower fixing seats 14, 15 and the cooperative fastening members 16 (with reference to FIGS. 4A and 4B), the rack body 10 can be back-to-back assembled into a double-face tabletop dripping rack. A base seat 131 is previously disposed under the bottom of the rack body so that the bottom of the rack body is parallel to the tabletop and the rack body can be stably rested thereon. Furthermore, the bottom fixing block 143 of the lower fixing seat is formed with locking holes 141 for locking with the tabletop (as shown in FIG. 9) so as to more firmly lock the dripping rack on the tabletop. When changed into a single-face wall-hanging type, the fastening members 16 and the lower fixing seat 14 are detached to quickly separate the two rack bodies 10.

Figure 5:
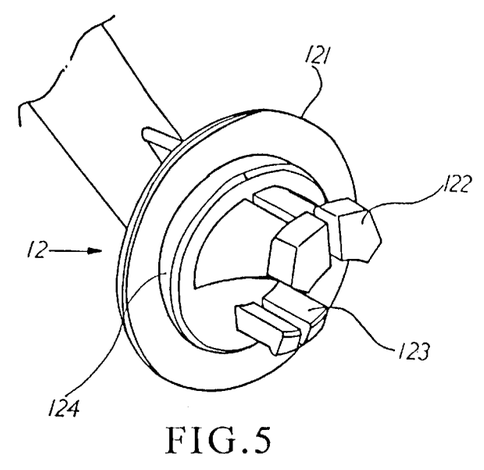
FIG. 5 is a perspective view of the tenons of the dripping bar of the present invention.
Figure 6A:
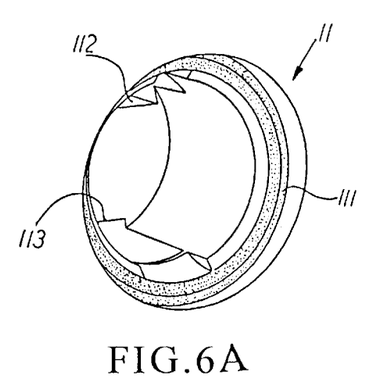
FIG. 6A is a perspective view of front side of the fitting hole of the dripping rack of the present invention.
Figure 6B:
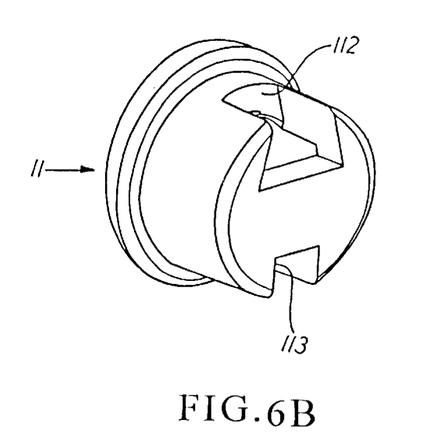
FIG. 6B is a perspective view of rear side of the fitting hole of the dripping rack of the present invention.
Figure 6C:
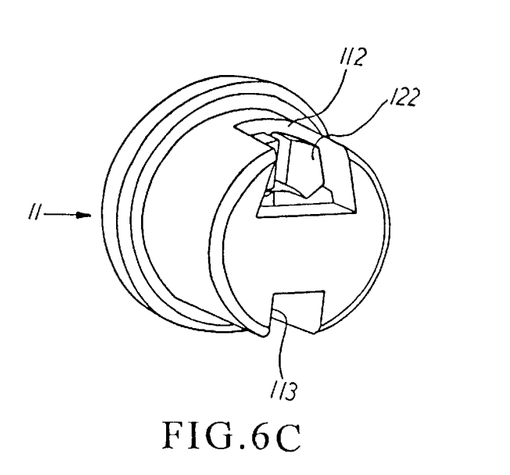
FIG. 6C is a perspective view showing that the tenons of the dripping bar are engaged in the mortises of the fitting hole.
Figure 7A:
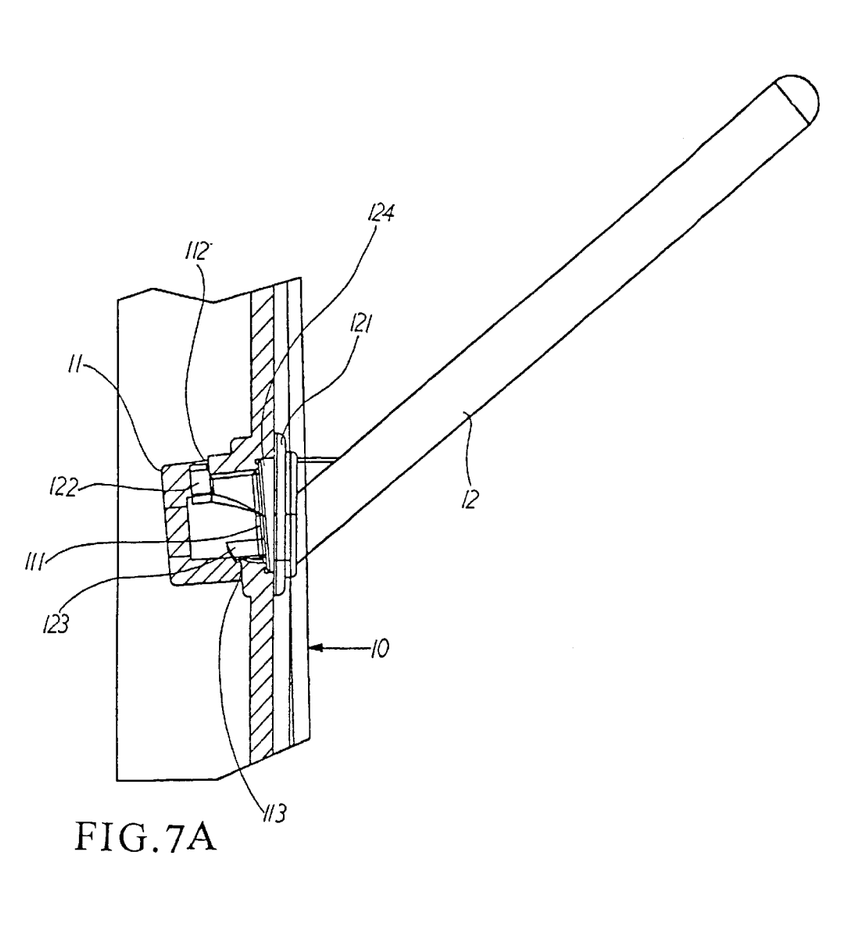
FIG. 7A is a sectional view showing that the dripping bar is fitted in the fitting hole.
Figure 7B:
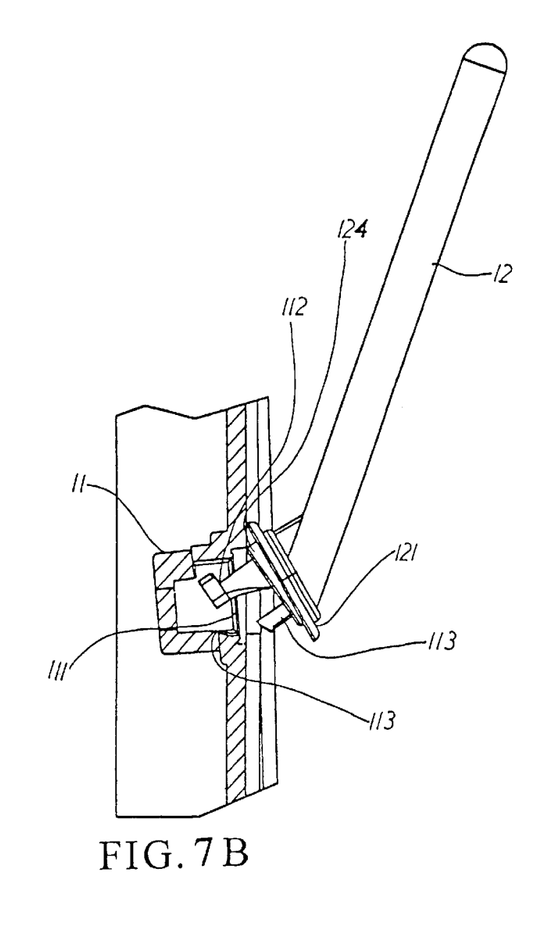
FIG. 7B is a sectional view showing that the dripping bar is detached from the fitting hole.

Please refer to FIGS. 5, 6A and 6B. The tail end of the dripping bar 12 is formed with two symmetrical long tenons 122 and two symmetrical short tenons 123. A circular stop plate 121 and a cylindrical section 124 are formed behind the tenons. The inner wall of the fitting hole 11 is formed with a long mortise 112 and a short mortise 113. A water-sealing ring 111 is integrally disposed on an inner circumference of the opening of the fitting hole 11. Referring to FIGS. 6C, when fitting the dripping bar into the fitting hole, the tenons 122, 123 of the dripping bar 12 are latched in the mortises 112, 113 of the fitting hole 11 to firmly connect the dripping bar 12 in the fitting hole 11. The circular stop plate tightly attaches to the rack body 10 and the water-sealing ring 111 in the fitting hole 11 is sealedly engaged with the cylindrical body 124 of the dripping bar 12 (with reference to FIG. 7A) to avoid leakage. When detaching the dripping bar 12, referring to FIGS. 7A and 7B, the dripping bar 12 is directly detached from the front face of the rack body 10. Such a procedure is convenient and time-saving. When extending the tenons into the fitting hole, the long tenons 122 are first inclinedly extended into the bottom thereof and then moved downward to engage the short tenon 123 with the mortise 113. When detached, the procedure is reversed. When hanging a ware, the dripping bar 12 is subject to a downward force and the long tenons are able to firmly support the ware.

Figure 8:
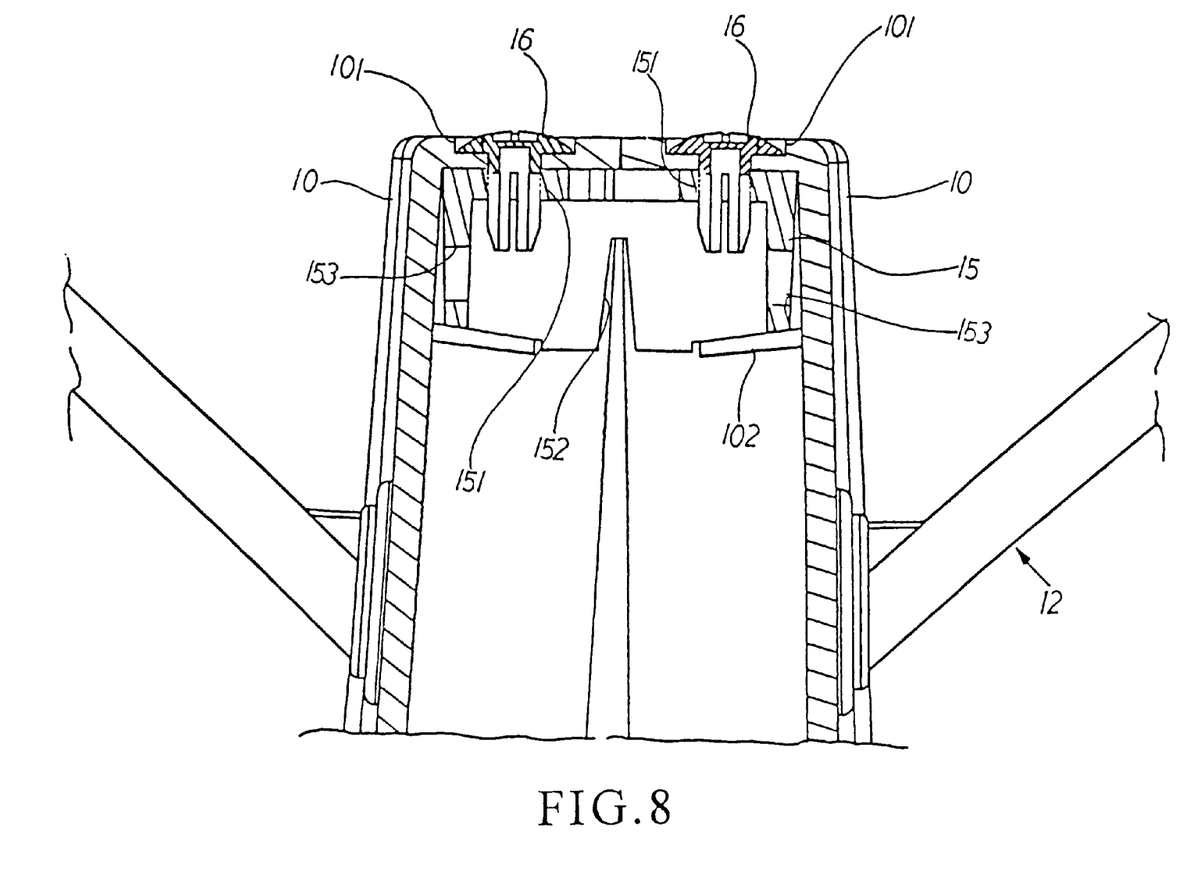
FIG. 8 is a sectional view of the upper fixing structure of a double-face type of dripping rack for resting on a tabletop.
Figure 10A:
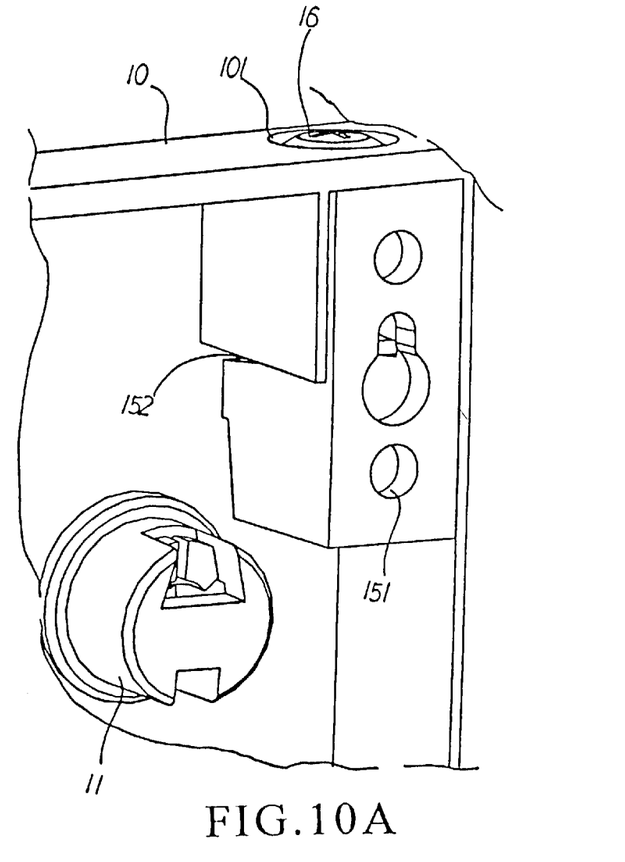
FIG. 10A is a perspective view showing the use of the upper fixing seat of a single-face type of dripping rack for hanging on a wall.
Figure 10B:
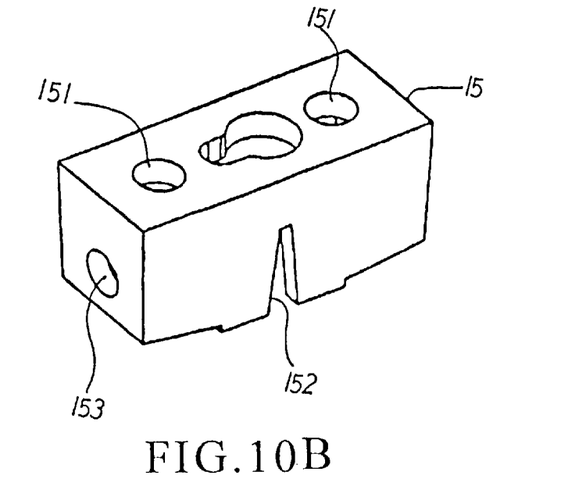
FIG. 10B is a perspective view of the upper fixing seat of the present invention.

When detaching the fixing structure of the rack body 10, referring to FIGS. 8 and 9, the fastening member 16 is untightened from the fixing hole 151 of the upper fixing seat and the fastener hole 101 of the rack body 10 so as to loosen and detach the upper fixing seat 15. The lower fixing seat 14 can then be taken out from the fixing seat hole 151 of the projecting block 144. When changed from a double-face type into a single-face type, the notch 152 of the upper fixing seat 15 is fitted onto the projecting plate 102. Then, the fastening member 16 is tightened in the lateral locking hole 153 ( referring to FIGS. 10A and 10B ).

Figure 11A:
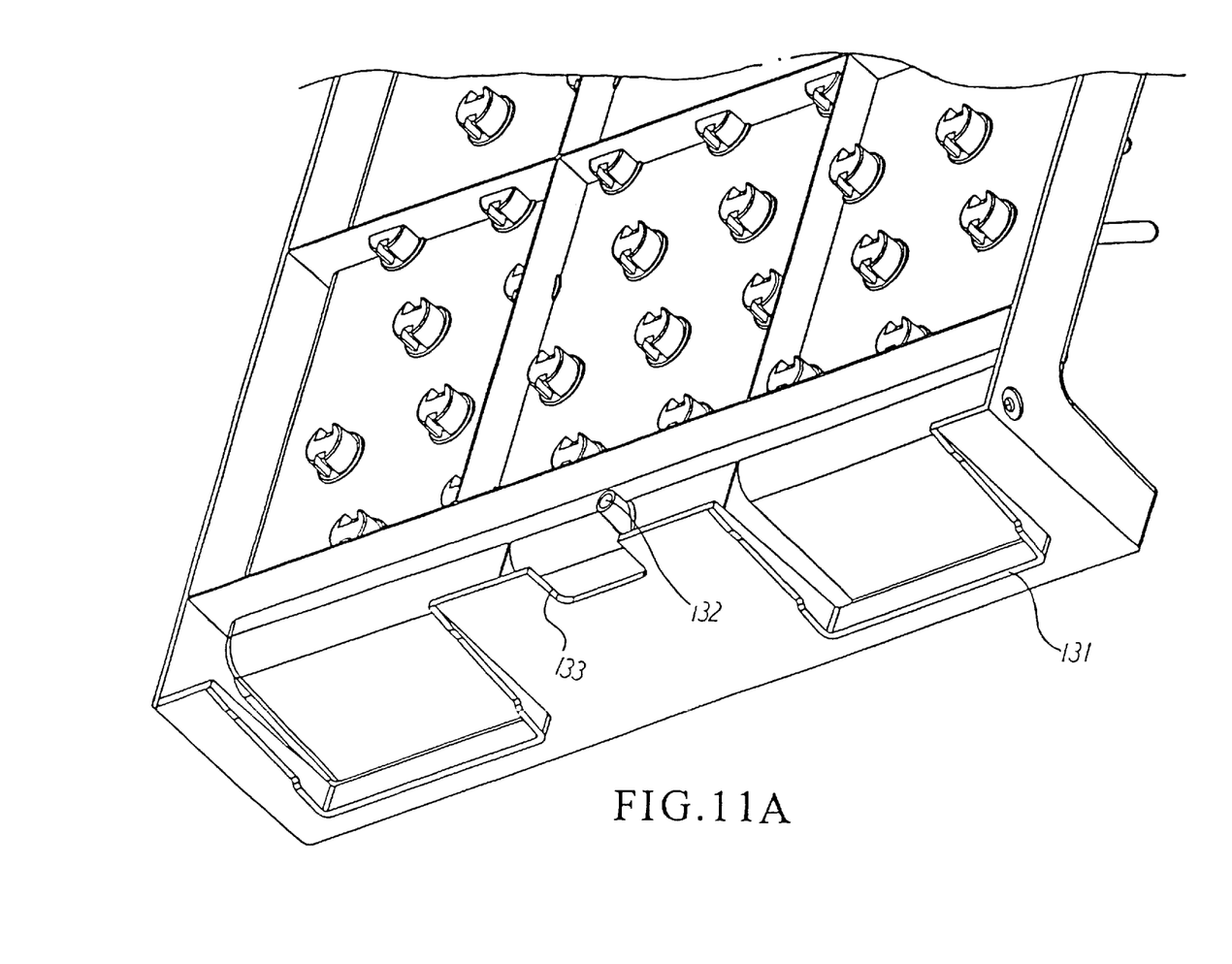
FIG. 11A is a perspective view of the draining hole and draining hose recess of a lower side of the rack body of the present invention.
Figure 11B:
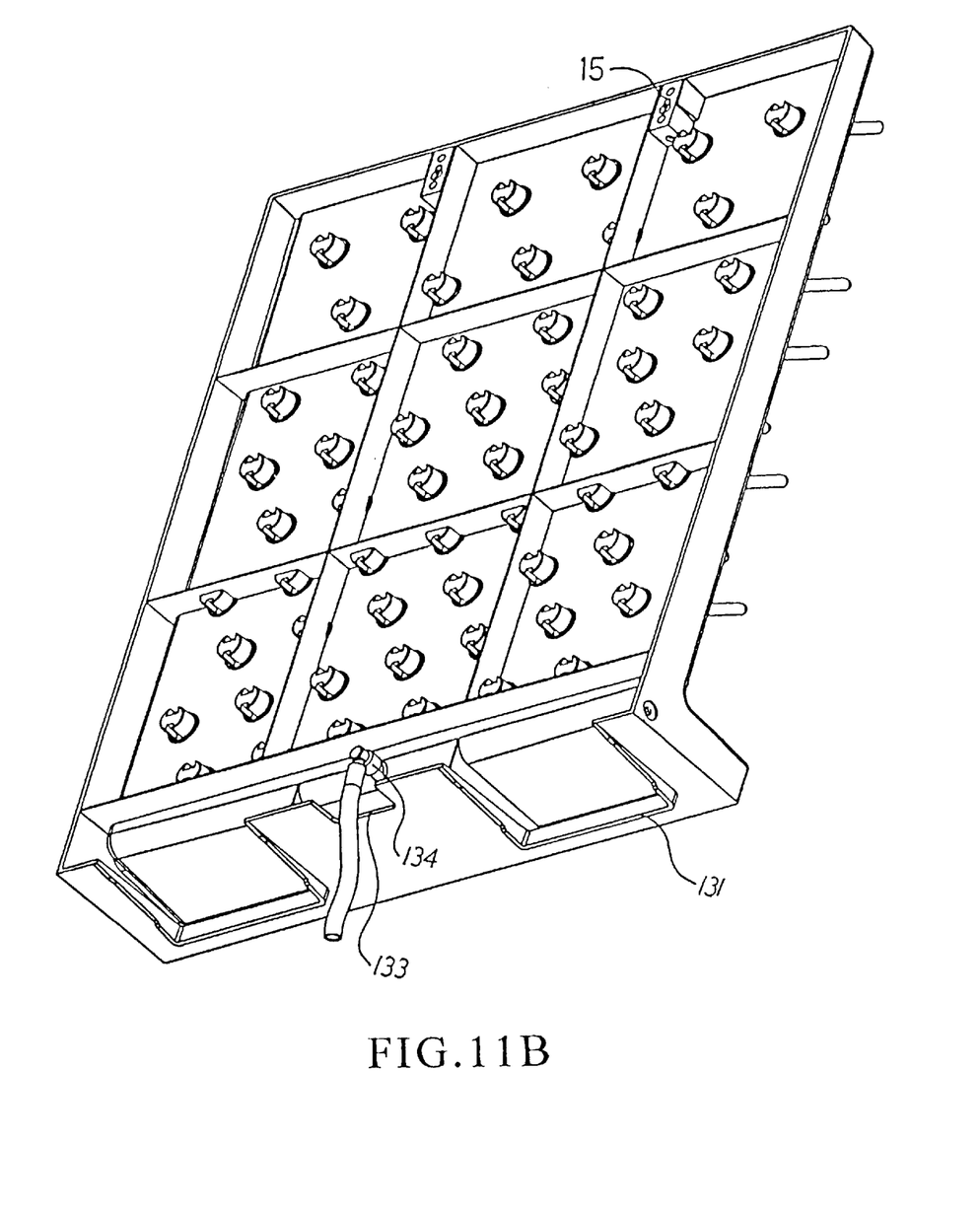
FIG. 11B is a perspective view of the draining pipeline of the lower side of the single-face type of dripping rack of the present invention.
Figure 11C:
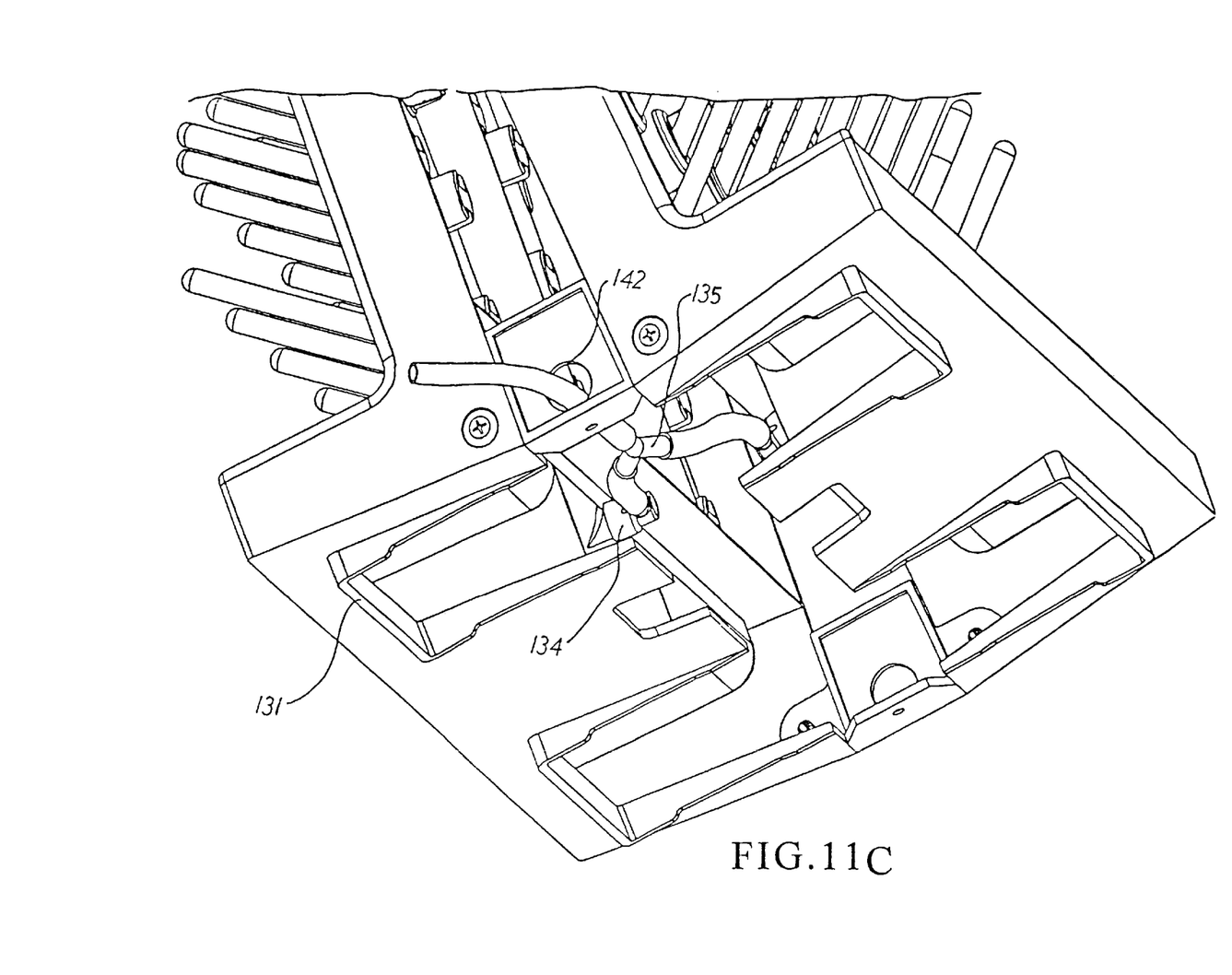
FIG. 11C is a perspective view of the draining pipeline of the lower side of the double-face type of dripping rack of the present invention.

The draining connector 132 is positioned at the lowest portion of the draining sink and extends downwardly and rearwardly therefrom. When hung on a wall, the draining connector 132 is connected with a draining hose via an L-shaped adapter 134. The lower side of the rack body is formed with a draining hole recess 133 for the draining hose to pass therethrough. In the case of double-face type for resting on a tabletop, the draining connector 132 is connected with the draining hose via the L-shaped adapter 134 and the Y-shaped adapter 135. The hose passes through a draining hose escape hole 142 of a lateral side of the lower fixing seat 14. Therefore, the water can be smoothly drained out. (FIGS. 11A, 11B and 11C show the draining hole, draining hose recess and draining pipeline.)

The above arrangement has the following advantages:

1. The rack body 10 of the dripping rack is integrally made by plastic injection molding so that it has light weight and high strength and is not subject to damage. The rack body is mainly made of PP material so that it will not secondarily contaminate the washed glass wares.
2. The dripping bar 12 is engaged in the fitting hole 11 by means of tenons and mortises. Therefore, the dripping bar 12 can tightly attach to the rack body 10. In addition, a water-sealing means is disposed in the fitting hole 11 to avoid leakage.
3. The mounting positions of the dripping bars 12 can be changed according to the size of the wares. The dripping bar 12 and the rack body 10 contain an elevation angle so that the ware can be safely placed on the dripping bar 12 without dropping.
4. The bottom of the rack body 10 is provided with a draining sink 13 having an internal slope face, whereby the water flowing into the sink can be quickly drained out of the rack body 10 through the draining connector 132.
5. The draining connector 132 more quickly and conveniently drains out the water accumulated in the draining sink.
6. The rack body 10 can be changed between a single-face type and a double-face type as desired. When changed, a user only needs to detach the fixing seats 14, 15 and the fastening members 16 from the rack body 10 and and re-assemble them following the change. Therefore, the change can be easily and quickly completed.

The above embodiments are only used to illustrate the present invention, and are not intended to limit the scope thereof. Many modifications of the above embodiments can be made without departing from the spirit of the present invention.

What is claimed is:

1. A dripping rack structure, comprising:
   a rack body formed with multiple fitting holes;
   a plurality of dripping bars fitted into said fitting holes;
   sealing caps surrounding said dripping bars and also fitted into said fitting holes; and
   an upper fixing seat, a lower fixing seat, and cooperating fastening members arranged to fasten the upper fixing seat and lower fixing seat to a corresponding upper fixing seat and lower fixing seat on another rack body in order to change a single face rack into a double face rack, wherein:
   the rack body has a trapezoidal shape, a bottom end of the rack body being provided with a draining sink integrally formed with the rack body, an inner side of the draining sink being formed with a water-guiding slope face inclined from an outer side toward a rear central portion of the draining sink, whereby water dripping into the draining sink can be collected and quickly drained out through a draining connector at the bottom of the rack body;

an upper edge of an inner rear wall of each fitting hole is formed with a long mortise and a lower edge of each fitting hole is formed with a short mortise, a water-sealing ring being disposed on inner circumferences of respective openings of the fitting holes;

an upper side of a tail end of each dripping bar includes two symmetrical long tenons, two symmetrical short tenons being formed under the long tenons, and the dripping bars further respectively including a cylindrical section and a circular stop plate situated behind the tenons, the tenons corresponding to the mortises of the fitting hole;

whereby the mounting positions of the dripping bars are changeable according to the size of the wares, the dripping bar and the rack body extending outwardly and upwardly at an angle at which the ware can be stably rested on the dripping bar; and whereby the tenons of a respective dripping bar are latched in the mortises of the fitting hole so as to firmly, quickly, and detachably connect the respective dripping bar with the rack body.

2. A dripping rack structure as claimed in claim 1, wherein the upper fixing seat is a rectangular body, an upper end face thereof being formed with corresponding fixing holes, two lateral faces of the upper fixing seat being respectively formed with lateral locking holes, a center of a bottom end of the upper fixing seat being formed with a notch having a wider outer end and a narrower inner end, whereby when said fastening members are assembled to said fixing holes, the fastening members are locked in the fixing holes of the upper fixing seat and the fastener holes of the rack body, thereby changing the rack body from a single-face type to a double-face type.

3. A dripping rack structure as claimed in claim 1, wherein a middle portion of the lower fixing seat is a trapezoidal block and a lower side of a center of the lower fixing seat is formed with a draining hose escape hole, two lateral sides of the trapezoidal block being respectively formed with two flat projecting blocks integrally formed the trapezoidal block, the projecting blocks including corresponding fixing holes, a bottom of the trapezoid block being integrally formed with a fixing block, and a center of the fixing block being formed with a tabletop locking hole for mounting the rack body on a tabletop.

4. A dripping rack structure as claimed in claim 1, wherein the draining connector is integrally formed on a lower side of a center of the draining sink, the draining connector being arranged to be connected with a draining hose via an L-shaped adapter and a Y-shaped adapter for single-face type and double-face type dripping racks, the draining hose being passed through a draining hose escape hole of the lower fixing seat for smoothly draining water.

* * * * *